(12) United States Patent
Boland

(10) Patent No.: US 11,188,526 B2
(45) Date of Patent: Nov. 30, 2021

(54) DATABASE QUERY CREATION

(71) Applicant: KONINKLIJKE PHILIPS N.V., Eindhoven (NL)

(72) Inventor: Miguel d'Arcangues Boland, Prevessin (FR)

(73) Assignee: Koninklijke Philips N.V., Eindhoven (NL)

(*) Notice: Subject to any disclaimer, the term of this patent is extended or adjusted under 35 U.S.C. 154(b) by 208 days.

(21) Appl. No.: 16/090,920

(22) PCT Filed: Apr. 12, 2017

(86) PCT No.: PCT/EP2017/058777
§ 371 (c)(1),
(2) Date: Oct. 3, 2018

(87) PCT Pub. No.: WO2017/178527
PCT Pub. Date: Oct. 19, 2017

(65) Prior Publication Data
US 2019/0108172 A1    Apr. 11, 2019

(30) Foreign Application Priority Data
Apr. 12, 2016 (EP) .................... 16164834

(51) Int. Cl.
*G06F 16/242* (2019.01)
*G06F 16/332* (2019.01)
*G06F 16/25* (2019.01)

(52) U.S. Cl.
CPC ........ *G06F 16/2428* (2019.01); *G06F 16/252* (2019.01); *G06F 16/3329* (2019.01)

(58) Field of Classification Search
CPC .................. G06F 16/2428; G06F 16/252
See application file for complete search history.

(56) References Cited

U.S. PATENT DOCUMENTS 6,460,031 B1 * 10/2002 Wilson, III ............. G06F 40/10
707/769
8,126,937 B2    2/2012 Shaburov
(Continued)

FOREIGN PATENT DOCUMENTS

| | | |
|---|---|---|
| EP | 2897059 A1 | 7/2015 |
| WO | 2004070629 A2 | 8/2004 |

OTHER PUBLICATIONS

Tsuda, et al., "IconicBrowser: An Iconic Retrieval System for Object-Oriented Databases", Journal of Visual Languages and Computing (1990), vol. 1, No. 1, Mar. 1, 1990, pp. 59-76.
(Continued)

*Primary Examiner* — Grace Park

(57) ABSTRACT

Presented are concepts for generating a database query for analyzing data in a database, wherein the data comprises a plurality of features, and wherein at least one of the plurality of features comprises a value which varies as a function of a parameter. One such concept provides a graphical user interface for enabling a user to arrange a plurality of graphical elements in a user-defined sequence as a function of the parameter, wherein each graphical element being associated with a respective one or more of the plurality of features. Based on the user-defined sequence of the graphical elements, one or more rules relating to at least one of the plurality of features may be determined. A database query may then be generated based on the one or more rules.

11 Claims, 7 Drawing Sheets

(56) References Cited

U.S. PATENT DOCUMENTS

| | | | |
|---|---|---|---|
| 8,887,076 B2 | 11/2014 | Frohliger | |
| 2003/0113040 A1 | 6/2003 | Nishiyama et al. | |
| 2006/0085395 A1* | 4/2006 | Cradick | G06F 16/33 |
| 2007/0266019 A1* | 11/2007 | Lavi | G06F 16/9535 |
| 2008/0281802 A1 | 11/2008 | Peterson et al. | |
| 2009/0018994 A1* | 1/2009 | Hajdukiewicz | G06F 16/242 |
| 2009/0024940 A1 | 1/2009 | Zeringue et al. | |
| 2012/0259878 A1* | 10/2012 | Iguchi | G06F 16/80 |
| | | | 707/758 |
| 2013/0055147 A1 | 2/2013 | Vasudev et al. | |
| 2013/0151572 A1 | 6/2013 | Brocato et al. | |
| 2014/0006446 A1 | 1/2014 | Carter et al. | |

OTHER PUBLICATIONS

Catarci, et al., "Visual Query Systems for Databases: A Survey", Journal of Visual Languages and Computing (1997), vol. 8, No. 2, Apr. 1, 1997, pp. 215-260.

* cited by examiner

US 11,188,526 B2

DATABASE QUERY CREATION

CROSS-REFERENCE TO PRIOR APPLICATIONS

This application is the U.S. National Phase application under 35 U.S.C. § 371 of International Application No. PCT/EP2017/058777, filed on Apr. 12, 2017, which claims the benefit of European Application No. 16164834.0, filed Apr. 12, 2016. These applications are hereby incorporated by reference herein, for all purposes.

FIELD OF THE INVENTION

This invention relates to querying databases and more particularly to generating a query for analysing data of a database.

BACKGROUND OF THE INVENTION

Databases are often used in software engineering to store, read and write large quantities of data effectively and quickly. A common database structure is a relational database, which uses reference fields to relate a line in a table to a line in a parent table. In order to retrieve and store data, users or programs are required to generate a database query in a programming language designed for managing data held in a relational database. This requires a certain degree of knowledge and skill, as it is a form of software engineering. As such, the usage of relational databases by non-technical staff can be greatly hindered by their reduced knowledge of an adequate programming language.

In order to circumvent this requirement, frameworks have been developed to provide a layer of abstraction to the programming language. This can help a non-technical user to interact with databases in a safe and efficient manner with minimal training. A common implementation of this proposal is a dynamically expandable form which allows users to select tables in a database, a particular field in that table, and a relation between this field and a potentially different object and field combination.

However, these approaches incur a number of drawbacks, the most notable of which is poor scalability. Because expanding the number of related objects incurs an exponential increase in the number of rules, form-based systems can often become cumbersome and difficult to comprehend, especially for inexperienced or non-technical users lacking adequate programming knowledge.

SUMMARY OF THE INVENTION

The invention aims to at least partly fulfil one of the aforementioned needs. To this end, the invention provides methods, computer program products and systems as defined in the independent claims. The dependent claims provide advantageous embodiments.

Thus, the invention provides a method of and corresponding system for generating a database query for analyzing data in a database using a processor arrangement, the data comprising a plurality of features, wherein at least one of the plurality of features comprises a value which varies as a function of a parameter. The method comprises: the processor arrangement performing the steps of: providing a graphical user interface, GUI, for enabling a user to arrange a plurality of graphical elements in a user-defined sequence as a function of the parameter, each graphical element being associated with a respective one or more of the plurality of features; determining, based on the user-defined sequence of the graphical elements, one or more rules relating to at least one of the plurality of features; and generating a database query based on the one or more rules.

Proposed embodiments are based on the concept of enabling a user to use a GUI to arrange graphical elements in a user-defined sequence. Based on the user-defined sequence of the graphical elements, rules relating to features associated with the graphical elements may be determined and subsequently used for generating a database query. Such embodiments may therefore enable a user to graphically illustrate rules and/or relationships between features of database data. Graphical depiction of features of data in a database may enable a user to more-easily understand rules and/or relationships relating to the features which, in turn, may enable the user to understand and/or create more complex rules for the purpose of analyzing data in a database.

In this way, there may be provided graphical tools and/or methods for building queries for analysing data in a database and/or for investigating relationships between various data entries/attributes. This may alleviate a need for programming knowledge, thus enabling non-technical staff to interact with databases in a safe and efficient manner with minimal training.

Exemplary embodiments may thus provide a graphical interface that would allow a user, for instance, to graphically define a query like: 'Which patients (whose data is comprised in a database) have experienced vomiting between the second and third cycle of chemotherapy?' The user interface may allow the user to position graphical representations (e.g. graphical elements) of the second and third cycles of chemotherapy (features with values: 'yes' or 'no') relative to each other in a virtual space. In this way, the therapy cycles can be positioned relative to each other as a function of a parameter, which in this case is time, and then the addition of further search conditions like vomiting may be enabled. Once the sequence has been fully defined, rules may be inferred from the user-defined arrangement of the graphical representations and a search query then automatically built based on the rules. This way of query building may be much more simple and efficient than writing each query directly in text. It also enables relationships between features to be visualised, aiding a user's understanding.

In the example mentioned above, the features have a value which varies as a function of time. In other words, the parameter in the aforementioned example is time. However, it will be appreciated that values of features may vary as a function of other parameters, and there may be a wide range (and potentially infinite amount) of parameters. By way of example only, in other embodiments, features may have a value which varies as a function of at least one of: time; date; amount; location; age; count; size; length; pressure; temperature; duration; speed; priority; etc. A parameter may therefore comprise any suitable factor upon which a feature may depend.

In an embodiment, the GUI may comprise a user input region extending along at least one axis and the GUI may be further adapted to enable the user to arrange the plurality of graphical elements in or adjacent to the user input region so as to specify the user-defined sequence based on a relative positioning of the plurality of graphical elements with respect to the at least one axis. The user input region may, for example, extend along two orthogonal axes. The GUI may then be further adapted to enable the user to arrange the plurality of graphical elements in the user input region so as to specify the user-defined sequence based on relative positioning of the plurality of graphical elements with respect to the two orthogonal axes. In this way, a user may position graphical elements in a two-dimension (virtual) space, wherein their relative positioning within the space is representative of rules and/or relationships between features associated with the graphical elements. Also, the axes of the (virtual) space may be representative of a parameter upon which a value of the feature(s) may depend. In this way, the positioning of the graphical elements in the (virtual) space with respect to an axis may be used to specify one or more parameter values. A user input region provided by an embodiment may therefore provide a flexible, powerful, and easy to understand input interface which helps a user to generate and/or understand database queries.

Further, the user input region may comprise a grid-like pattern to which the user is enabled to align the plurality of graphical elements. The step of determining one or more rules may then be further based on a relative alignment of the graphical elements with respect to the grid-like pattern. Such a grid-like pattern may assist a user in placing graphical elements (so as to ensure correct sequence or relationship definitions). It may also assist a user's visualisation or understanding of the relative positioning (or relationships) between graphic elements (and thus their associated parameters).

For example, an abstract (e.g. no definition of scale, but definition of units on an x-axis) grid pattern may be provided onto which there can be placed rectangular boxes representing objects mirroring individual lines in a database table. Relative placement of the boxes may determine a relative range of possible values of features with regards to the x-axis (which may be representative of a parameter, such as time, upon which a value of the feature(s) may depend). Additionally, or alternatively, the vertical placement of boxes (e.g. in the y-axis) may permit the range of values for each feature to overlap (fully or partially).

An embodiment may further comprise the step of: providing a first user interface component for enabling the user to specify further information relating to the user-defined sequence. The step of determining one or more rules may then be further based on the further information relating to the user-defined sequence. Embodiments may therefore be thought of as providing an operator which enables a user to further specify the user-defined sequence. Such embodiments may therefore provide additional input options, increasing the flexibility and power of database query generation.

Some embodiments may further comprise the step of: providing a second user interface component for enabling the user to specify a value of a feature associated with a graphical element of the plurality of graphical elements. The step of determining one or more rules may then be further based on the value of the feature. Thus, there may be provided a tool which enables a user to further specify a feature to be included in the user-defined sequence, e.g. by specifying a value or value range for a feature. Such an additional input tool may further improve the flexibility and/or usability of the proposed graphical interface.

Each graphical element may be defined at least by a first graphical property, the first graphical property being representative of a value of a feature associated with the graphical element. The step of determining one or more rules may then be further based on the first graphical property of at least one of the graphical elements. Examples of graphical properties may include: shape, size, position, orientation, blinking, pulsation, opacity and/or colour. They may be based on one or more attributes of a feature. In this way, a graphical element may be displayed in such a manner that a user can quickly and easily infer information about a feature associated with graphical element (from one or more graphical properties of the graphical element). This may enable a viewer to more easily identify and assess one or more features and may enable improved understanding/comprehension of a user-defined sequence of the graphical elements.

Embodiments may thus enable information about features in a database to be represented in a manner which helps to ensure that relevant details are shown or made easily identifiable.

In an embodiment, the GUI may be arranged for enabling a user to arrange a graphical object relative to at least two graphical elements so as to define a relationship between the features associated with the at least two graphical elements. The step of determining one or more rules may then be further based on the relationship between the features associated with the at least two graphical elements. Also, the graphical object may be defined by at least by an object graphical property, the object graphical property being representative of a value of the features associated with the at least two graphical elements.

The step of determining one or more rules may then be further based on the object graphical property of the graphical object. By way of example, a graphical object may comprise a horizontal candlestick object comprising three vertical lines joined by a horizontal line. Such a horizontal candlestick object may enable a user to define more complex relationships between two graphical elements (and thus their associated features). For instance, the two horizontal areas defined between these three vertical lines may be assigned values to determine the range of values they represent. The positioning of the three lines relative to the minimum and maximum value of any object may then allow users to create rules.

Exemplary embodiments may further comprise the steps of: generating a natural language expression, NLE, of the database query; and generating instructions for displaying the NLE of the database query via the GUI. This may, for example, enable a user to quickly and easily assess whether or not the database query is suitable or as intended. In this way, embodiments may be adapted to provide human-readable information about generated queries so that a user can easily understand whether or not a user-defined sequence of graphical elements accurately represents an intended or desired rule or relationship.

Proposed embodiments may further comprise generating instructions for displaying the GUI on a display device using a processor device. Generating instructions for display of a GUI can mean generating a control signal for use by a display device. Such instructions can be in the form of simple images such as bitmap JPEG or other format. However, such instructions can also be more complex allowing real time build-up of the GUI or parts of the GUI on a regular display device such as for example CRT, LCD, OLED, E-ink or the like.

According to another aspect, there may be provided a computer program product downloadable from a communications network and/or stored on a computer readable medium and/or microprocessor-executable medium wherein the computer program product comprises computer program code instructions, which when executed by at least one processor, implement a method according to a proposed embodiment.

According to another aspect, there may be provided a system for generating a database query for analyzing data in a database, the data comprising a plurality of features, wherein at least one of the plurality of features comprises a value which varies as a function of a parameter. The system may comprise at least one processor and a computer program product according to a proposed embodiment.

The system may further comprise a display device for displaying the graphical user interface.

In an embodiment, the system may comprise: a server device having the at least one processor; and a client device comprising the display device. The server device may be configured to generate instructions for displaying the graphical user interface on a display device and to transmit the generated instructions for displaying the GUI to the client device, and the client device may be configured to receive the generated instructions for display of the GUI and to use the instructions to display the GUI.

In another embodiment, the system may comprise a client device comprising the data processor device and the display device. This may be a standalone device receiving database data, storing database data and/or even further configured to access database data if the processor is configured for that. In other words, a user (such as a medical professional, technician, researcher, etc.) may have an appropriately arranged client device (such as a laptop, tablet computer, mobile phone, PDA, etc.) which provides a GUI according to an embodiment and thus enables the user to arrange graphical elements in a user-defined sequence for the purpose of generating a database query.

The independent claims define analogous advantages features for method and system claims. The advantages explained for the method herein above and herein below may therefore also apply to the corresponding systems.

The system may comprise: a server device comprising the at least one processor, where the server device may be configured to transmit generated instructions for display of the GUI to a client device or communication network. In such a configuration, display instructions are made available by a server. A user may therefore link with the server to work with the GUI.

The processor may be remotely located from the display device, and a control signal may thus be communicated to the display device via a communication link. Such a communication link can be e.g. the internet and/or a wireless communication link. Other suitable short-range or long-range communication links and/or protocols may be employed. In this way, a user (such as a medical researcher, data analyst, engineer, etc.) may have an appropriately arranged display device that can receive and display information on a GUI according to an embodiment for analysing data of a database which is remotely located from the user. Embodiments may therefore enable a user to remotely generate database queries using a portable display device, such as a laptop, tablet computer, mobile phone, PDA, etc.

The system may further comprise: a server device comprising the at least one processor; and a client device comprising a display device. Dedicated data processing means may therefore be employed for the purpose of determining one or more rules relating to at least one of the plurality of features, and generating a database query based on the one or more rules, thus reducing processing requirements or capabilities of other components or devices of the system.

Thus, it will be understood that processing capabilities may therefore be distributed throughout the system in different ways according to predetermined constraints and/or availability of processing resources.

BRIEF DESCRIPTION OF THE DRAWINGS

The invention will now be described in detail with reference to the following schematic drawings.

DETAILED DESCRIPTION OF THE EMBODIMENTS

Figure 1:
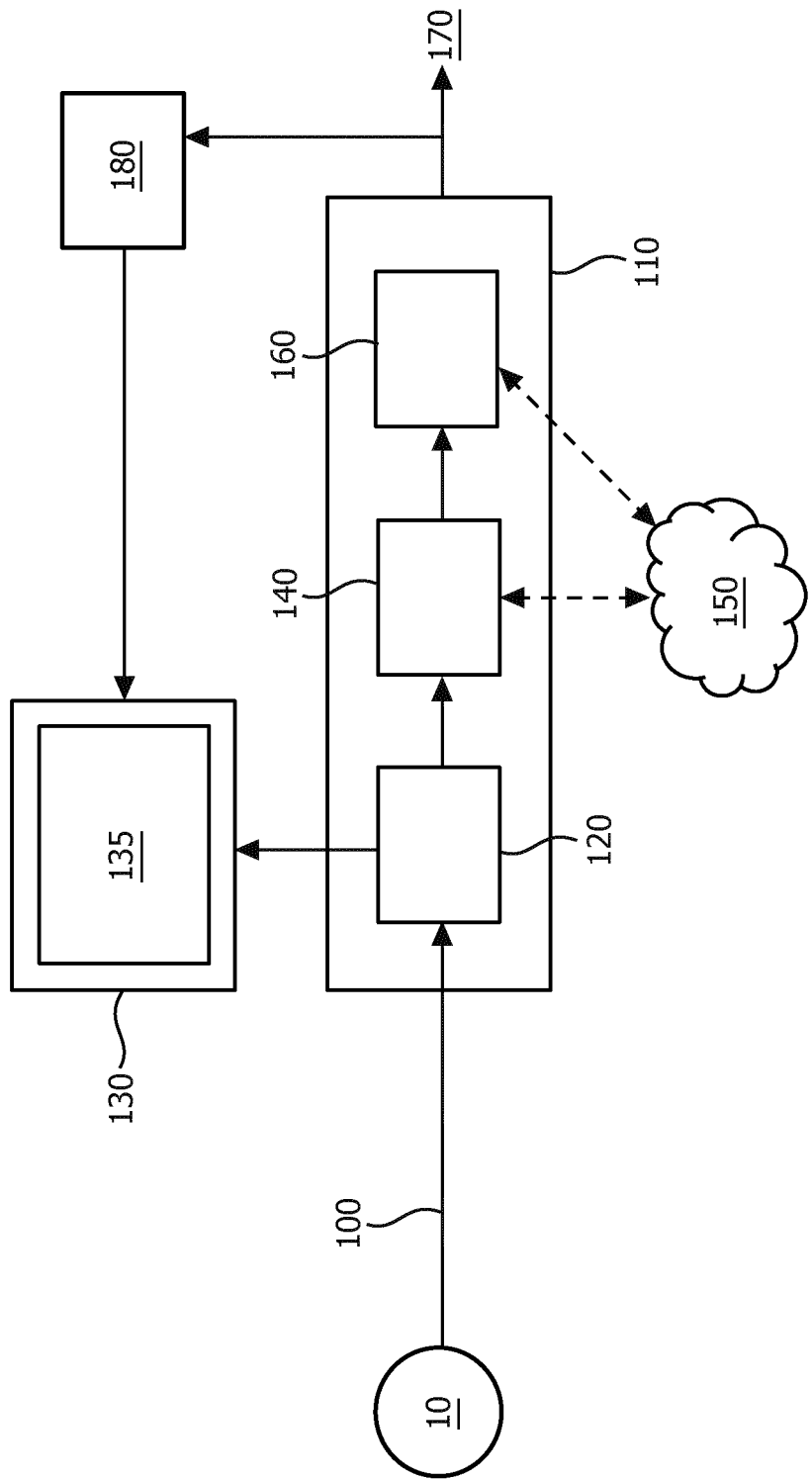
FIG. 1 is a block diagram of a system for generating database queries according to an embodiment.

Proposed embodiments relate to graphical approaches and tools for building database queries for accessing information in a database. Data in a database may comprise a plurality of features, and at least one of the plurality of features may comprise a value which varies as a function of a parameter, such as time, temperature, count, size, length, etc. In some embodiments, the database may be formed from a plurality of data records, each data record comprising a plurality of data fields such that a feature may be represented by a data field of an arbitrary data record.

The invention may be therefore be utilized in conjunction with many different types of database, including relational databases. A database may comprise, for instance, data relating to the treatment of patients undergoing chemotherapy. Such data may comprise the number of the treatment cycles, white blood cell count, temperature, an indication whether or not the patient has experienced nausea and/or vomiting, etc. In another example, database may comprise data relating to a chemical process that follows some temperature path. Embodiments may therefore provide a method, device and/or system that provides a graphical approach to building queries for analysing such data in a database, thereby enabling investigation into relationships between various data entries by inexperienced or non-technical users.

The invention provides concepts for defining database queries with a GUI. Proposed methods include, for example, defining a database query by positioning graphical elements in a GUI. A database query can then be generated based on the relative positioning of the graphical elements. Embodiments may therefore provide a graphical tool that builds database queries, thus catering for different user programming capabilities/knowledge. Illustrative embodiments may therefore provide concepts for defining rules and/or relationships relating to database features based on the location(s)/position(s) at which a user positions graphical elements in a GUI. Dynamic user-based database query generation may therefore be provided by proposed embodiments.

In particular, the present invention is directed toward enabling a user to use a GUI to build a database query by arranging graphical elements in a user-defined arrangement, pattern or sequence, wherein the arrangement, pattern or sequence of the graphical elements is defined with respect to a parameter. This may enable a user to quickly and easily build complex database queries, even without programming knowledge. Further, the GUI may display information about rules and relationships between features with simplicity such that a user can readily and easily understand a generated database query.

As a result, proposed embodiments may be of benefit in any data-related position which utilises relational data, especially where researchers or data analysts require the use of a database querying language in order to conduct research. A working example that has been implemented enables usage by researchers in a medical field to find patients responding to a particular criterion, in an effort to identify, predict and analyse patterns of treatments and admissions to improve patient health and hospital efficiency. Embodiments may therefore be of particular benefit for systems utilising large relational datasets, especially as a form of dataset querying and visualisation.

The following description provides a context for the description of elements and functionality of the invention and of how elements of the invention can be implemented.

In the description, the following terms and definitions are used.

A graphical user interface (GUI) is a type of interface that allows users to interact with electronic devices through graphical icons and visual indicators such as secondary notation.

A display device is an electronic display device that can be controlled by a display control device. The display control device can be part of, or operate together with, a processor device.

Generating instructions for displaying a GUI can comprise (or be as simple as) constructing images (Bitmap, JPEG, Tiff or the like) of GUI views to be displayed on a display device using regular methods known in the art. Alternatively, such generation of instructions can comprise more dedicated instructions for real time build-up of a GUI view. The instructions can be in the form of a display control signal.

The invention is at least partly based on the insight that it is advantageous to use a GUI to define or control the generation of a database query (through relative placement of graphical elements of the GUI by a user). In particular, relative placement of a plurality of graphical elements in a (virtual) space provided by the GUI can specify a user-defined sequence that is representative of one or more rules relating to database features associated with the graphical elements. In other words, user-defined arrangement of graphical elements in a GUI may be used to define rules from which a database query may be generated.

The graphical elements may have a graphical property (or graphical feature) that is representative of a value of a feature associated with the graphical element. In particular, a graphical feature or property of a graphical element may be set according to a value of a feature associated with the graphical element. In other words, a value of a database feature may be used to alter the appearance of graphical elements by way of altering a graphical property.

Graphical properties can for example be chosen from the group of: spatial location/position (or relative mutual location/position in case there are multiple graphical elements) of the graphical element(s) in a GUI area, orientation, size (dimensions such as height width length and/or area size), shape (outline shape), shape fill (hatching, shading or the like), colour, contrast, hue, opacity, display frequency (continuous, flashing, or blinking with a specified frequency). Preferably the graphical element(s) have a rectangular shape or a shape with rounded corners such as rectangular shape with rounded corner, circular shape or oval shape. This gives a GUI appearance, especially when a plurality of graphical elements is present in the GUI view.

The invention may thus employ the concept that the appearance of a graphical element in a displayed GUI may be representative of an attribute or value of a database data feature. A viewer of such graphical elements may therefore imply or infer information from the appearance of the graphical elements, even when they are devoid of any text, numbers, or alphanumeric characters for example. By way of example, visual comparison of the graphical element's graphical properties/features may specify relative information about associated feature of data in a database, thus enabling simple and quick identification of information about the feature(s) by a viewer. Graphical elements of a certain shape, for example, may indicate features of a certain value range, and may therefore be quickly and easily specified or identified amongst a display comprising a high number of graphical elements. Also, large graphical elements may relate to more important (e.g. higher priority) data features, whereas smaller graphical elements may relate to less important (e.g. lower priority) data features. In this way, rules or relationships between data features may be specified or identified in a graphical manner.

The graphical features used in the GUI can be predefined or can be user-defined. For the latter purpose, the invention may employ a step where a user is enabled to provide graphical feature definition input using a user input device.

As will be apparent from the below described embodiments, there is herein proposed the concept of a method of generating a database query, in which a user may position graphical elements about a graphical user interface (GUI) so as to define or otherwise determine the database query. A graphical element may be representative of at least one feature of data, where the at least one feature is associated with a variable parameter, such that the feature has a variable parameter.

The position of the graphic element (relative to the GUI and/or other graphical elements) is indicative of a value of a variable parameter associated with feature(s) represented by that graphical element. Furthermore, a database query may be generated based on the relative positioning, relationship and/or other definable association between different graphical elements and/or the overall GUI.

In some examples, there may be more than one relationship between a same pair of graphical elements (e.g. a positional relationship, such as a relative distance between the graphical elements being below a certain threshold, a feature relationship, such as both graphical elements representing a same feature, or even a user-defined relationship). The database query may be generated based on one or more such relationships.

In the invention, a user input device can be one or more of the following: a keyboard, mouse or other screen pointer device, touch sensitive display screen, speech recognition device or any other means known in the art.

Referring now to FIG. 1, there is depicted a block diagram of a system for generating a database query for analysing data of a database. In the system of FIG. 1, a user input device 10 is arranged to receive user inputs from a user. In this example, the input device 10 is a mouse device adapted to control the position of a cursor in a displayed GUI and to receive input commands/signals via one or more buttons of the mouse. The mouse is adapted to output a user input signal 100 which is representative of user input commands/actions for the displayed GUI. Of course, other types of user input devices may be employed so as to provide signals indicative a user input to the system. Such input devices may be part of existing computing or communication devices such as mobile phones, computers, tablets or the like.

The input device 10 is configured to communicate the user input signal(s) 100 via a wired or wireless connection to a processor unit 120 of a database query generation system 110. By way of example, the wireless connection may comprise a short-to-medium-range communication link. For the avoidance of doubt, short-to-medium-range communication link should be taken to mean a short-range or medium-range communication link having a range of up to around 100 meters. In short-range communication links designed for very short communication distances, signals typically travel from a few centimetres to several meters, whereas, in medium-range communication links designed for short to medium communication distances, signals typically travel up to 100 meters. Examples of short-range wireless communication links are ANT+, Bluetooth, Bluetooth low energy, IEEE 802.15.4, ISA100a, Infrared (IrDA), Near Field Communication (NFC), RFID, 6LoW-PAN, UWB, Wireless HART, Wireless HD, Wireless USB, ZigBee. Examples of medium-range communication links include Wi-Fi, ISM Band, Z-Wave.

Here, the user input signals 100 are not encrypted for communication via the wired or wireless connection in a secured manner. However, it will be appreciated that one or more encryption techniques and/or one or more secure communication links may be employed for the communication of signals in the system to protect personal data of a person monitored.

The processor unit 120 is adapted to receive the user input signal(s) 100 and to generate instructions for displaying a GUI 135 on a display device 130. Here, generating instructions for display of the GUI 135 comprises the generation of a control signal for use by the display device 130. Such instructions can be in the form of simple images such as bitmap, JPEG or other format. However, such instructions can also be more complex allowing real time build-up of the GUI or parts of the GUI on a regular display device such as for example CRT, LCD, OLED, E-ink or the like.

In this way, the processor unit 120 is adapted to provide a GUI (via the display device 130) which enables a user to arrange a plurality of graphical elements in a user-defined sequence as a function of a parameter (such as time for example). Arrangement of the graphical elements is undertaken in response to the signal(s) 100 provided by a user via the input device 10. Put another way, a user provides input commands/instructions to the processor unit 120 (via the input device), and the processor unit 120 then controls the display of the GUI 135 based on the received input commands/instructions.

Each graphical element of the GUI is associated with a respective data feature of the database. The user may thus use the input device 10 to arrange the graphical elements of the GUI 135 in a user-defined sequence (as a function of the parameter). This therefore enables a user to graphically define rules and/or relationships between features of database data.

In other words, each graphical element may be ordered or positionable about the GUI by a user via input device 10, the relative position being representative of at least a value (of a feature) associated with a particular parameter.

Information regarding the user-defined sequence of graphical elements is passed from the processor 120 to a rule inference unit 140 of the system 110. The rule inference unit 140 is adapted to determine, based on the user-defined sequence of the graphical elements, one or more rules relating to at least one of the features associated with the graphical elements. For this purpose, the rule inference unit 140 may communicate with one or more external or remote data processing resources. In this case, such a processing resource is one available in the internet forming a so-called "cloud" 150. Such data processing resources may undertake part or all of the processing required to infer or determine rules relating to the feature(s) associated with the graphical elements (based on the user-defined arrangement/sequence of graphical elements). Thus, the embodiment may employ distributed processing principles using distribution of data processing over the cloud 150, rule inference unit 140 and/or an external/remote client device (not shown).

In other words, the rule inference unit 140 may be adapted to determine the rule(s) based on at least a layout, arrangement or distribution of the graphical elements with respect to the GUI or to one another. In particular, the rule(s) may be determined based on a positional relationship between the graphical elements and the GUI and/or one another (i.e. where the graphical elements are positioned with respect to each other and/or the GUI). In some embodiments, the rule is determined based on associating a relationship between graphical elements (such as a positional relationship or hierarchical relationship) with a known or predetermined rule. Multiple such rules (associated with multiple relationships) may be combined by the rule inference unit 140 to infer/determine the one or more rules relating to at least one of the features associated with the graphical elements.

Put another way, the rule inference unit 140 is preferably adapted to determine or infer at least one rule, relating to at least one of the features associated with the graphical elements, based on a pattern or an order of the graphical elements with respect to one another.

The rule inference unit 140 is further adapted to output the inferred/determined rule(s) to a query generating unit 160 of the system 110. In other words, after having inferred or determined one or more rules relating to the feature(s) associated with the graphical elements (either with or without communicating with data processing resources via the internet or "cloud"), a signal representative of the rule(s) is generated and provided to the query generating unit 160.

The query generating unit 160 is adapted to determine, based on the rule(s), a database query for analysing data of the database. For this purpose, and similarly to the rule inference unit 140, the query generating unit 160 may communicate with one or more external or remote data processing resources. In this case, such a processing resource is one available in the "cloud" 150, and this may undertake part or all of the processing required to generate the database query (based on the rule(s) determined by the rule inference unit 140).

The query generating unit 160 is further adapted to output a database query signal 170 representative of the generated database query.

The depicted example of FIG. 1 also comprises a unit 180 that is configured to use the database query signal 170 to generate instructions (possibly in the form of a display control signal) for display of information about the generated database query on display device 130 (e.g. for providing database query information to one or more users). Such signals can be transmitted via wired or wireless connection. The wireless connection may be chosen according to examples described hereinabove for transmission of the input signal(s) 100. However, where the system has made use of data processing resources via the internet or cloud 150, a signal may be made available to the display device 130 via the internet or cloud 150.

Figure 2A:
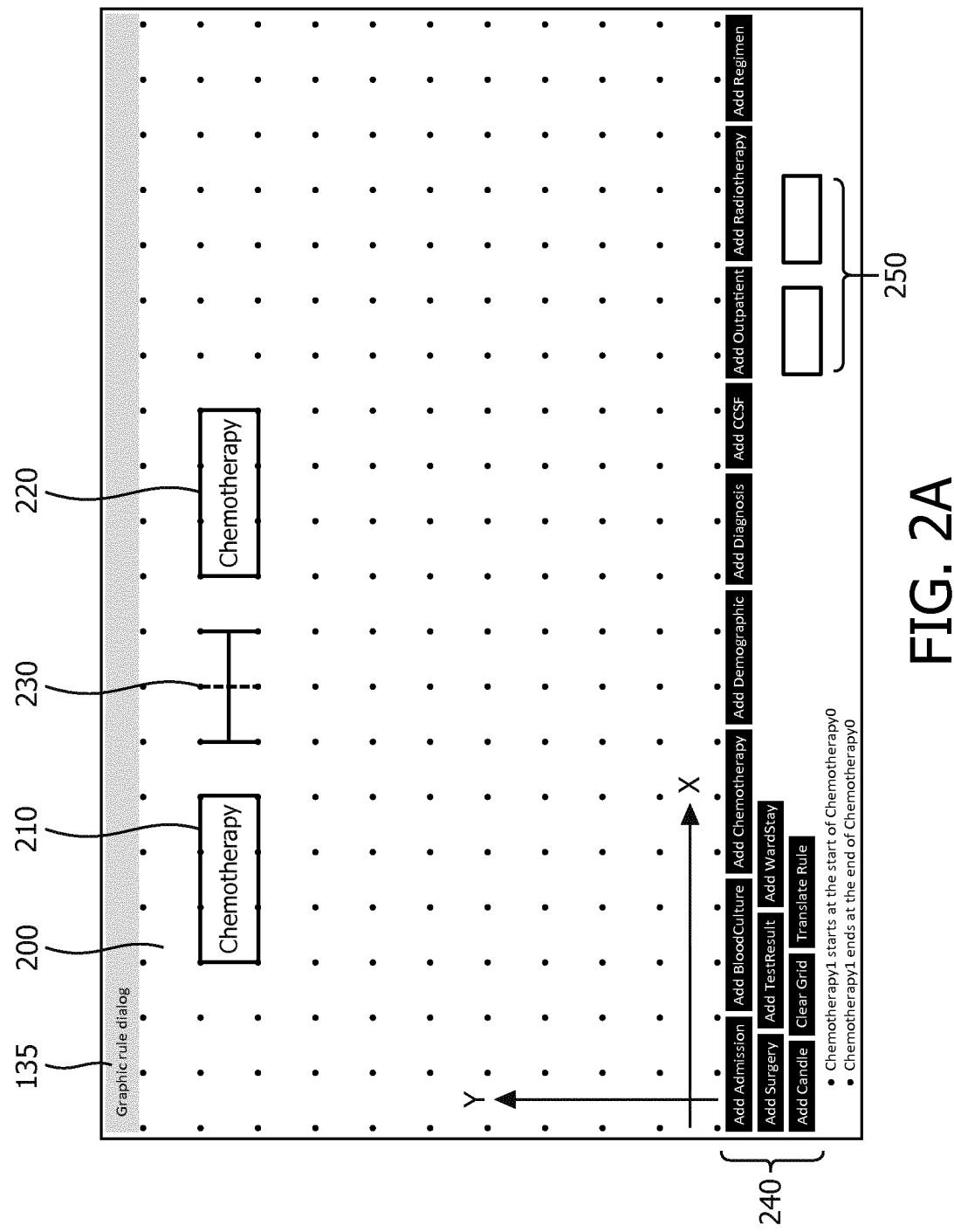
FIG. 2A is an exemplary displayed view of a GUI according to an embodiment.

FIG. 2A is an exemplary view of the GUI 135 as displayed on the display device 130 of FIG. 1. The GUI 135 comprises a user input area 200 within which graphical elements 210,220 and one or more graphical objects 230 can be positioned by a user. Because the GUI is at least partly displayed on a display device, a GUI user input area is effectively also a display area. In this example, first 210 and second 220 graphical elements are displayed in the user input area 200 along with a graphical object 230.

The user input area 200 is a two-dimensional area extending in both the X-axis and Y-axis (indicated by the arrows labelled "X" and "Y"). Thus, the user input region 200 extends along two orthogonal axes.

The user input area 200 is adapted to enable a user to arrange a plurality of graphical elements 210,220 in the user input area 200 so as to specify a user-defined arrangement or sequence based on relative positioning of the plurality of graphical elements with respect to the X-axis and/or the Y-axis. In this way, the user input area 200 enables a user to position graphical elements in a two-dimensional (virtual) space, wherein their relative positioning within the space is representative of rules and/or relationships between features associated with the graphical elements.

In this embodiment, it is also noted that the X- and Y-axes are each representative of a parameter upon which a value of the feature(s) may depend. In this way, the positioning of the graphical elements in the user input area 200 with respect to an axis is used to specify one or more parameter values. In particular, the X-axis is representative of time, wherein time elapses/passes from left to right along the X-axis.

In more detail, the user input area 200 of FIG. 2A comprises a grid-like pattern to which the user can align a plurality of graphical elements 210,220 and one or more graphical objects 230. Such a grid-like pattern may assist a user in placing graphical elements/objects (so as to ensure correct sequence or relationship definitions). It may also assist a user's visualisation or understanding of the relative positioning (or relationships) between the graphic elements (and thus their associated parameters). One or more rules may then be based on (at least) a relative alignment of the graphical elements 210,220 with respect to the grid-like pattern.

The graphical elements 210, 220 of the depicted example comprise rectangular boxes containing a label formed from alphanumeric characters. In particular, a first graphical element 210 comprises a rectangular box within which is provided text describing a data feature associated with the first graphical element 210. In this example, the text is "Chemotherapy", thus indicating the first graphical element 210 relates to a (first) cycle of chemotherapy. A second graphical element 220 comprises a rectangular box within which is provided text describing a data feature associated with the second graphical element 220. In this example, the text is "Chemotherapy", thus indicating the second graphical element 220 relates to a (second) cycle of chemotherapy.

As described hereinbefore, in the current example, the graphical elements 210,220 and their relative placement in the user input area 200 defines a sequence which can be used to specify rules used for the generation of a database query. By way of example, the rules may have a syntax relating the pair of graphical elements 210,220 as follows:

Object1-value1|value2-is larger|smaller-than-value1|value2-of Object2

The variation of the rule between the two graphical elements 210,220 is therefore designed to depend on the horizontal positioning of the start and end of each graphical element relative to the other graphical element's start and end.

In the depicted example of FIG. 2A, for example, the relative placement of first 210 and second 220 graphical elements establishes a requirement for two consecutive chemotherapy items, the second cycle being after the first cycle (because the second graphical element 220 is placed to the right of the first graphical element 210, with time increasing along the X-axis left to right).

This may be extended through the use of a graphical object positioned in the user input area 200 in addition to the graphical elements 210,220. Here, a graphical object 230 is arranged relative to the graphical elements 210, 220 so as to define a relationship between the features associated with the graphical elements 210,220. As a result, the process of determining one or more rules may also be based on the relationship between the features as defined by the graphical object 230.

By way of example, the graphical object 230 of FIG. 2A comprises a horizontal candlestick object 230 comprising three vertical lines joined by a horizontal line. The horizontal candlestick object 230 may enable a user to define more a complex relationship between the first 210 and second 220 graphical elements (and thus their associated features). For instance, the two horizontal areas defined between the three vertical lines can be assigned values to determine the range of values they represent. The positioning of the three lines relative to a minimum and maximum value of any graphical element then allows users to create ranged-based rules.

In the depicted example of FIG. 2A, for example, the placement of the horizontal candlestick object 230 relative to the first 210 and second 220 graphical elements allows the user to define a set time delay between two values which establishes a requirement for a time delay between the two consecutive chemotherapy items.

In order to enable a user to further specify a user-defined sequence, and thus provide additional input options, the GUI 135 of FIG. 2A also comprises additional user interface components 240. These components 240 are provided as graphical icons or buttons which can be selected and then used to specify further information relating to the user-defined sequence. The additional interface components 240 may therefore be thought of as providing operators which enable a user to further specify the user-defined sequence. Accordingly, the process of determining one or more rules may then be further based on the further information relating to the user-defined sequence.

Further, the GUI 135 of FIG. 2A also provides secondary user interface components 250 for enabling the user to specify a value of a feature associated with a graphical element. In this example of two graphical elements 210,220 being positioned in the user input area 200, two secondary user interface components 250 are provided, each being associated with a respective one of the graphical elements 210,220. The secondary user interface components 250 may therefore be thought of as providing a tool which enables a user to further specify a feature included in the user-defined sequence, e.g. by specifying a value or value range for a feature associated with a particular graphical element. The process of determining one or more rules may then be further based on further information provided via the secondary user interface components 250.

It will be appreciated that such additional input components/tools may further improve the flexibility and usability of the GUI 135 by providing for a range of input options and for additional information to be provided for further specifying rules, associations and/or values regarding features of database data.

In some embodiments, a user may be able to adjust the shape, size, position, orientation, blinking, pulsation, opacity and/or colour of a graphical element so as to alter a value of a feature associated with that graphical element. In other or further embodiments, the shape, size, position, orientation, blinking, pulsation, opacity and/or colour automatically alters in response to a change in a value of a feature associated with that graphical element so as to provide a graphical indication to a user of the value of the associated feature.

In response to any modification of a graphical element or graphical object of the GUI 135, the determined rule(s) may be converted (by an automated algorithm, for example) into a Natural Language Expression (NLE) and displayed to a user via the GUI 135. The NLE may provide an easily readable and understandable (e.g. human language) representation of the rule(s) which enables a user to quickly and easily assess whether or not the rules that have been created are correct, suitable or as intended. In other words, the GUI 135 is arranged to generate and display human-readable information about the rule(s) that have been created based on the user-defined arrangement or sequence of graphical elements (and any other associated input information). This can enable a user to easily understand whether or not a user-defined sequence of graphical elements accurately represents an intended or desired rule or relationship. An appropriate action, such as rearrangement of the graphical elements or confirmation to proceed, may then be undertaken before the rule(s) are used to generate a non-natural language database query for execution on a relational database server for example.

Alternatively, or additionally, embodiments may generate a NLE of the generated (non-natural language) database query and then display the NLE of the database query to the user via the GUI 135. The NLE of the database query may provide an easily readable and understandable (e.g. human language) representation of the database query which enables a user to quickly and easily assess whether or not the generated database query is correct, suitable or as intended. This may enable a user to quickly and easily assess a need for appropriate action, such as rearrangement of the graphical elements or confirmation to proceed. Embodiments may therefore be adapted to provide human-readable information about generated database queries so that a user can easily understand or assess the queries.

Figure 2B:
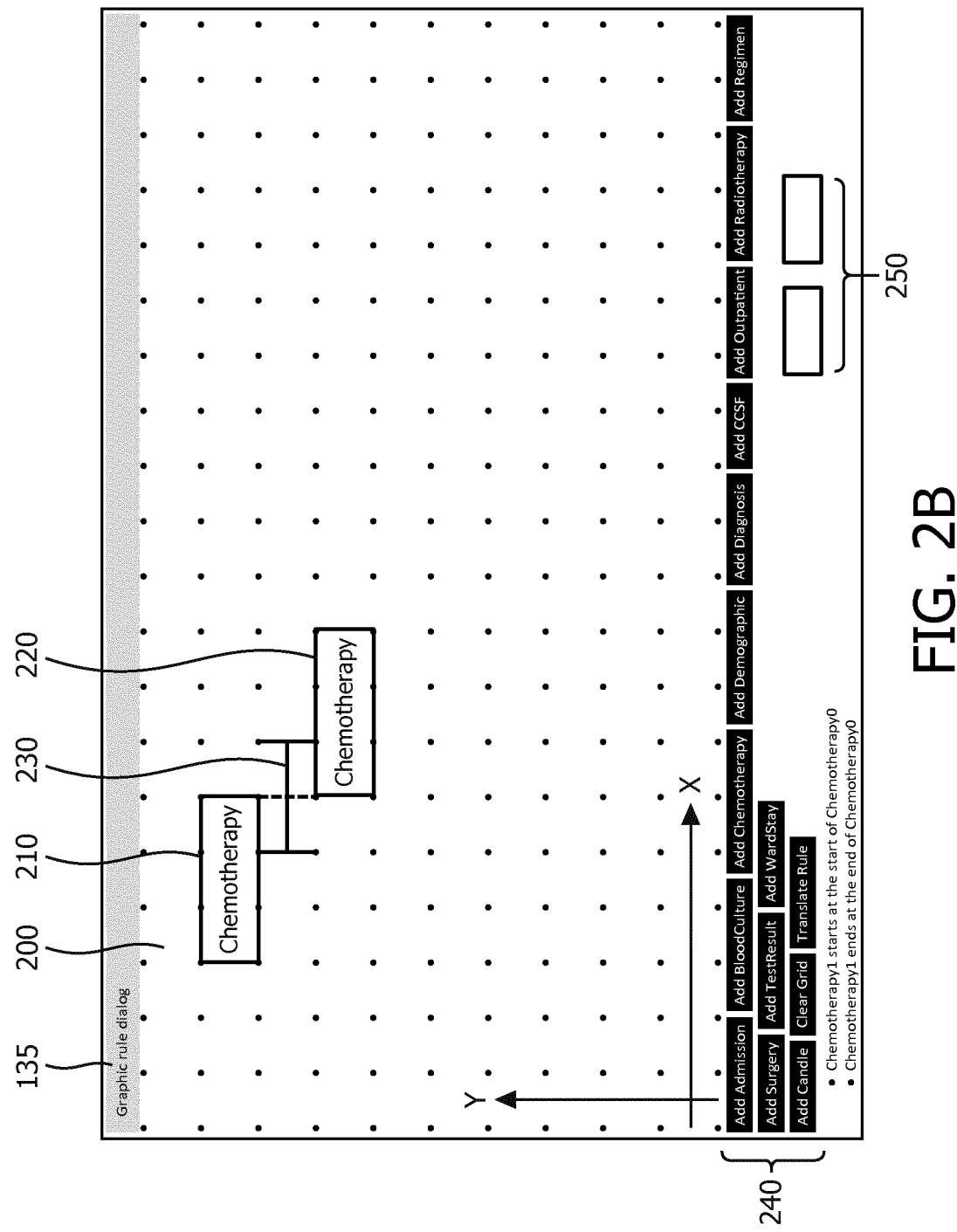
FIG. 2B depicts a modification to the displayed view of the GUI of FIG. 2A.

Referring now to FIG. 2B, there is depicted a modification to the displayed view of the GUI of FIG. 2A, wherein the first 210 and second 220 graphical elements are offset in respect of the Y-axis (i.e. offset vertically). Such relative vertical placement of the first 210 and second 220 graphical elements permits the range of value for each graphical element to overlap (fully or partially).

In the depicted example of FIG. 2B, for example, the relative placement of the first 210 and second 220 graphical elements and the horizontal candlestick object 230 allows the user to define that the end of the first event (e.g. the first chemotherapy cycle) associated with the first graphical element 210 must be as the same time as the start of the second event (e.g. the second chemotherapy cycle) associated with the second graphical, but the horizontal candlestick object 230 further defines that this may be within an allowable range of time (e.g. within −1 to +2 units of time).

It is noted that, in the examples of FIGS. 2A and 2B, the graphical elements 210, 220 are depicted as having a rectangular shape. It should however be understood that other shapes for the graphical elements may be employed, like circular, square, triangular, trapezoidal, a regular polygonal shape, a non-regular polygonal shape, etc. The shapes may also have rounded corners or vertices.

Further, each graphical element may be defined at least by a first graphical property, the first graphical property being representative of a value of a feature associated with the graphical element. For example, graphical properties may include: shape, size, position, orientation, blinking, pulsation, opacity and/or colour. In this way, a graphical element may be displayed in such a manner that a user can quickly and easily specify or infer information about a feature associated with the graphical element (for example, from it shape, size, colour, orientation, etc.). This may enable a viewer to more easily identify and specify a data feature associated with the graphical element. It may also improve understanding of a user-defined sequence of the graphical elements.

The process of determining one or more rules may then be based on the graphical properties of the graphical elements, thus providing a graphical way of representing attributes of features of data in a database.

Thus, there may be provided a graphical way to build queries for analysing data in a database and/or for investigating relationships between various data entries/attributes. Providing such a graphical approach may alleviate a need for programming knowledge, thus enabling non-technical staff to generate database queries with minimal training.

Figure 2C:
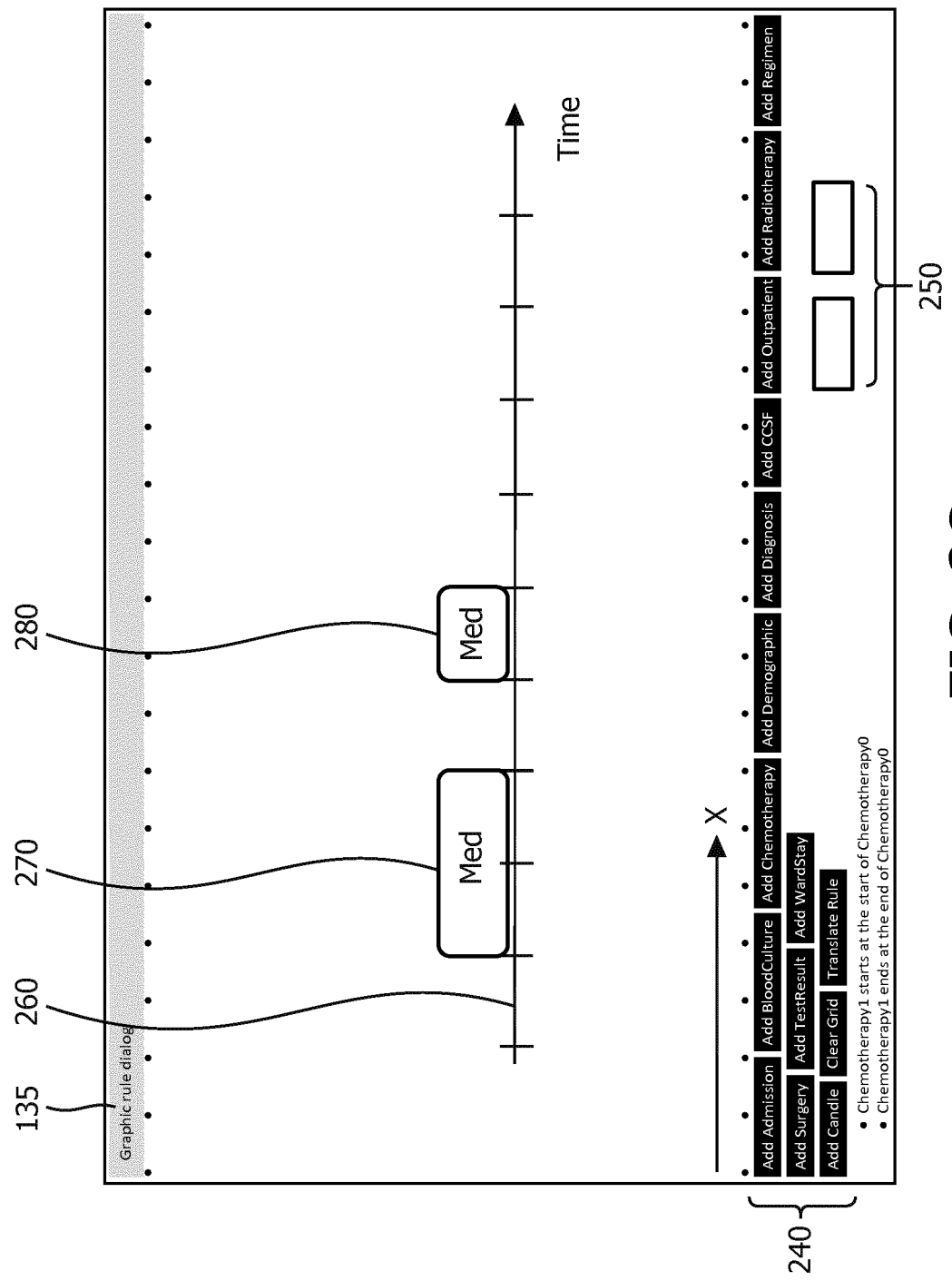
FIG. 2C depicts another modification to the displayed view of the GUI of FIG. 2A.

Referring now to FIG. 2C, there is depicted a modification to the displayed view of the GUI of FIG. 2A, wherein the user input area 260 comprises a horizontal line on (or next to) which graphical elements 270,280 can be positioned by a user.

In this example, first 270 and second 280 graphical elements are displayed as being positioned 'on' the line 260, in they are positioned to the upper side of the line with one (lower) edge of the each graphical element almost touching (e.g. closely proximate or adjacent) the line 260.

The user input area 260 is a one-dimensional straight line extending in the X-axis (indicated by the arrow labelled "X"). However, for the convenience of a viewer, markers are provided at equidistant locations along the line 260, wherein the markers are representative of value of a parameter upon a database data feature may depend.

The user input area 260 is adapted to enable a user to arrange a plurality of graphical elements 270,280 on (or adjacent) user input area 260 so as to specify a user-defined arrangement or sequence based on relative positioning of the plurality of graphical elements with respect to the X-axis. In this way, the linear user input area 260 enables a user to position graphical elements in a one-dimensional (virtual) space, wherein their relative positioning is representative of rules and/or relationships between features associated with the graphical elements.

In this embodiment, it is also noted that the X-axis is representative of time, wherein time elapses/increases from left to right along the X-axis. In this way, the positioning of the graphical elements in the user input area 260 with respect to the X-axis is used to relationships with respect to time. Also, the markers may assist a user in placing graphical elements/objects (so as to ensure correct sequence or relationship definitions). It may also assist a user's visualisation or understanding of the relative positioning (or relationships) between the graphic elements (and thus their associated parameters). One or more rules may then be based on (at least) a relative alignment of the graphical elements 270,280 with respect to the grid-like pattern.

The graphical elements 270,280 of the depicted example comprise rectangular boxes (with rounded edges) each containing a label formed from alphanumeric characters. In particular, the first graphical element 270 comprises a rectangular box (with rounded edges) within which is provided text describing a data feature associated with the first graphical element 270. In this example, the text is "Med", thus indicating the first graphical element 210 relates to a (first) cycle of medication. The second graphical element 280 comprises a rectangular box (with rounded edges) within which is provided text describing a data feature associated with the second graphical element 280. In this example, the text is "Med", thus indicating the second graphical element 280 relates to a (second) cycle of medication.

As described hereinbefore, in the current example, the graphical elements 270,280 and their relative placement on (or adjacent) the user input area 260 defines a sequence which can be used to specify rules used for the generation of a database query. By way of example, the rules may have a syntax relating the pair of graphical elements 270,280 as follows:

Object1-value1|value2-is larger|smaller-than-
       value1|value2-of Object2

The variation of the rule between the two graphical elements 270,280 is therefore designed to depend on the horizontal positioning of the start and end of each graphical element relative to the other graphical element's start and end.

In the depicted example of FIG. 2C, for example, the relative placement of first 270 and second 280 graphical elements establishes a requirement for two consecutive medication cycles, the second cycle being after the first cycle (because the second graphical element 280 is placed to the right of the first graphical element 270, with time increasing along the X-axis left to right).

Thus, from the example of FIG. 2C, it will be understood that the GUI 135 may provide a one-dimensional user input area 260, thus demonstrating embodiments need not be limited to two-dimensional (virtual) input area/spaces.

Figure 3:
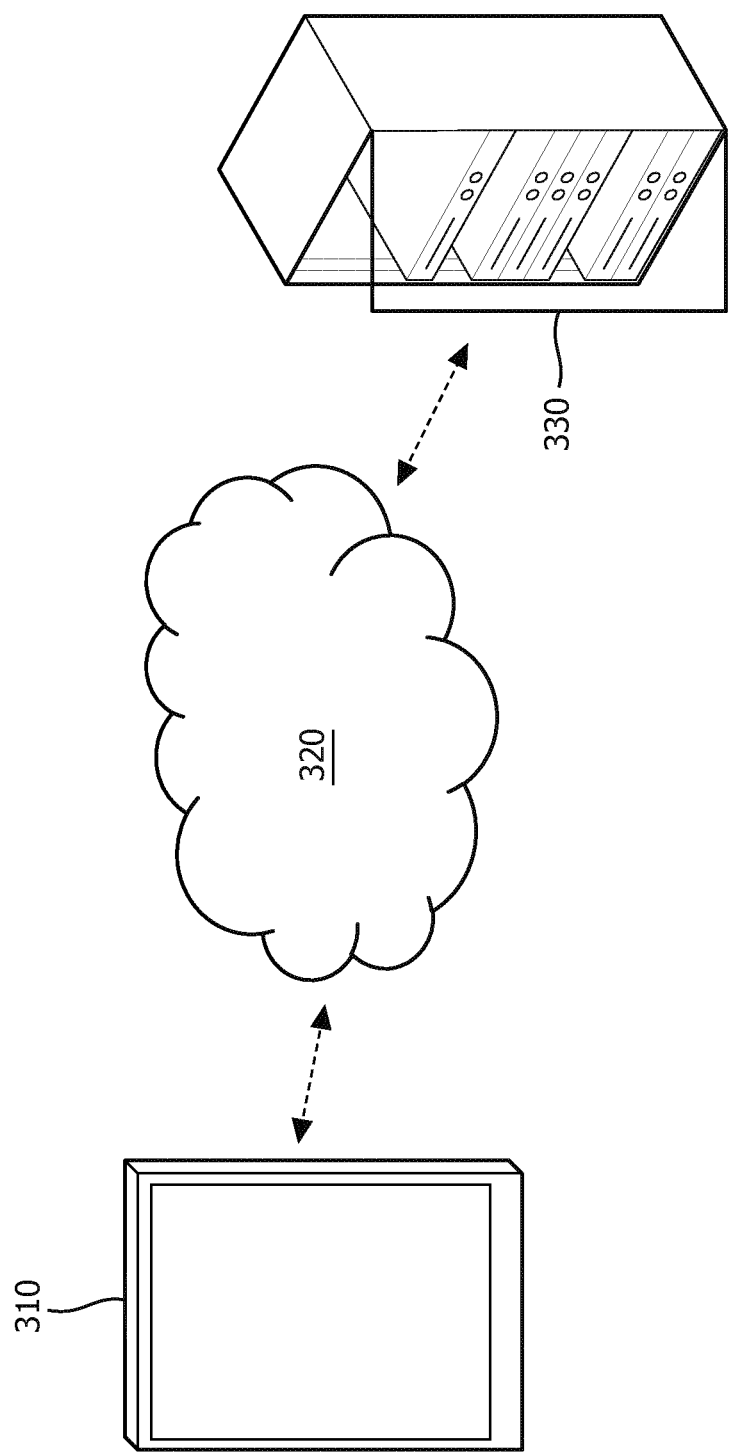
FIG. 3 is a block diagram of a distributed system for generating database queries according to an embodiment.

Referring now to FIG. 3, there is depicted a diagram of a distributed system for generating database queries according to an embodiment;

A user input device 310 is arranged to receive user inputs from a user. In this example, the input device 310 is a mobile computing device (such as a tablet computer) having a touch sensitive user interface adapted to receive input commands/signals from a user. The mobile computing device 310 also comprises a display screen adapted to display a GUI comprising graphical elements in accordance with embodiments of the proposed concepts, wherein user inputs (provided via the touch sensitive user interface can control the positioning graphical elements in the displayed GUI.

Based on the received user inputs, the user input device 310 is adapted to display one or more graphical elements in the GUI provided by its display screen. For this purpose, the use input device 310 comprises a software application for processing, decrypting and/or interpreting received user input signals in order to determine how to display graphical elements. Thus, the user input device 310 comprises a processing arrangement adapted to determine, from a user input, an attribute of a graphical element associated with data feature, and to generate a display control signal for modifying at least one of the size, shape, position, orientation, pulsation, opacity or colour of the graphical element based on the determined attribute.

The input device 310 is adapted to output signals representative of the user input commands/actions for the displayed GUI and/or information relating to the graphical elements (such as their relative positioning/arrangement in the GUI).

The input device 310 communicates the output signals via the internet 320 (using a wired or wireless connection for example) to a remotely located data processing system 330 (such as server).

The data processing system 330 is adapted to receive the one or more output signals from the input device 310 and to process the received signal(s) in accordance with a rule inference algorithm in order to infer/determine, based on the user-defined sequence or arrangement of graphical elements in the GUI of the input device 310, rules relating to one or more database data features associated with the graphical elements.

Further, the data processing system 330 is also adapted to communicate information representative of the rule(s) back to the input device 310. Based on such information received from the data processing system 330, the input device 310 is adapted to generate a NLE of the rule(s) and display the NLE of the rule(s) via the GUI. In this way, a user of the input device 310 can assess the suitability or accuracy of the rule(s) determined by the data processing system 330. Based on such an assessment, the user can take appropriate action, such as modifying the graphical elements in the GUI and/or provide an input indicative of acceptance of rule(s).

The input device 310 is adapted to output further signals representative of the user input commands/actions in response to the user assessment and/or information relating to the modified graphical elements (such as their modified relative positioning/arrangement in the GUI). The input device 310 is adapted to subsequently communicate the further signals via the internet 320 to the data processing system 330.

The data processing system 330 is adapted to receive the further signals from the input device 310 and to process the received further signal(s) in order to either: infer/determine updated rules relating to one or more database data features associated with the modified graphical elements (if the user modified the graphical elements and did not indicate acceptance of the previously generated rule(s)); or process the rule(s) in accordance with a query generation algorithm in order to generate one or more database queries based on the rule(s) (if the user indicated acceptance of the previously generated rule(s)).

The system is also adapted to communicate information about the generated queries back to the user input device 310 for subsequent use and/or display to the user. For example, user input device 310 may be used to generate and display a NLE of one or more database queries generated ad communicated by the data processing system .

Thus, the data processing system 330 provides a centrally accessible processing resource that can receive information from the input device 310 and run one or more algorithms to transform the received information into a set of determined or inferred rules. Information relating to the rule(s) can be stored by the data processing system (for example, in a rule data store) and provided to other components of the distributed system. Such provision of information about detected or inferred rules may be undertaken in response to a receiving a request (via the internet 320 for example) and/or may be undertaken without request (i.e. 'pushed').

Implementations of the system of FIG. 3 may vary between: (i) a situation where the data processing system 330 communicates display-ready data, which may for example comprise display data including graphical elements (e.g. in JPEG or other image formats) that are simply displayed to a user of a mobile computing device 310 using a conventional image or webpage display (such as web based browser etc.); to (ii) a situation where the data processing system 330 communicates raw rule or query information that the receiving mobile computing device 310 then processes to generate rules or queries based (for example, using local software running on the mobile computing device). Of course, in other implementations, the processing may be shared between the data processing system 330 and the mobile computing device 310 such that part of the rule or query data generated at data processing system 330 is sent to the mobile computing device 310 for further processing by local dedicated software of the mobile computing device. Embodiments may therefore employ server-side processing, client-side processing, or any combination thereof.

Further, where the data processing system 330 does not 'push' information, but rather communicates information in response to receiving a request, the user of a device making such a request may be required to confirm or authenticate their identity and/or security credentials in order for the information to be communicated.

Figure 4:
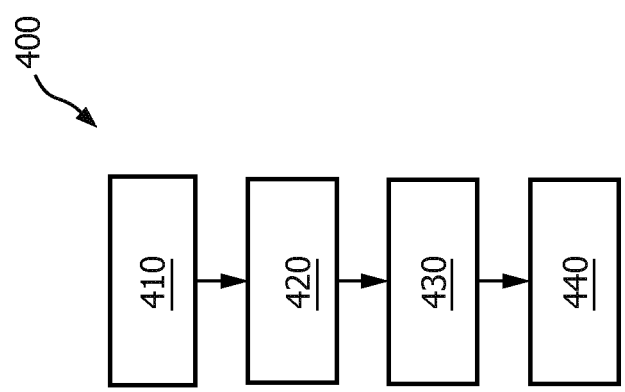
FIG. 4 shows a flow diagram of a method of generating a database query according to an embodiment.

Referring now to FIG. 4, there is shown a flow diagram of a method 400 of generating a database query for analyzing data in a database according to an embodiment, wherein the data comprises a plurality of features, and wherein at least one of the plurality of features comprises a value which varies as a function of a parameter (e.g. time, age, distance).

The method begins with step 410 in which a GUI is provided to a user for enabling the user to arrange a plurality of graphical elements in a user-defined sequence as a function of the parameter. Each graphical element is associated with a respective one or more of the plurality of feature of the data. For example, a first graphical element may be associated with a first feature, and a second graphical element may be associated with a second, different feature.

Then, in step 420, the user arranges such graphical elements in a user-chosen arrangement or sequence as a function of the parameter. In doing so, the user may make use of a user interface component to specify further information about the arrangement or sequence. The user may also make use of another interface component to specify a value of a feature associated with one or more of the graphical elements. Once the arrangement or sequence of graphical elements has been defined by the user, the method proceeds to step 430.

In step 430, one or more rules relating to at least one of the plurality of features are determining based on the arrangement or sequence of graphical elements. In doing so, the relative positioning of the graphical elements is used to determine rules and/or relationships relating to the features associated with the graphical elements. Graphical properties of the graphical elements and/or further information relating to the graphical elements may also be used when determining the rule(s).

Finally, in step 440, a database query is generated based on the one or more rules determined in step 430.

Thus, by way of example, the method 400 of generating a database query for analyzing data in a database may be implemented in a portable computing device (such as the smartphone or portable computer shown in FIG. 3).

Figure 5:
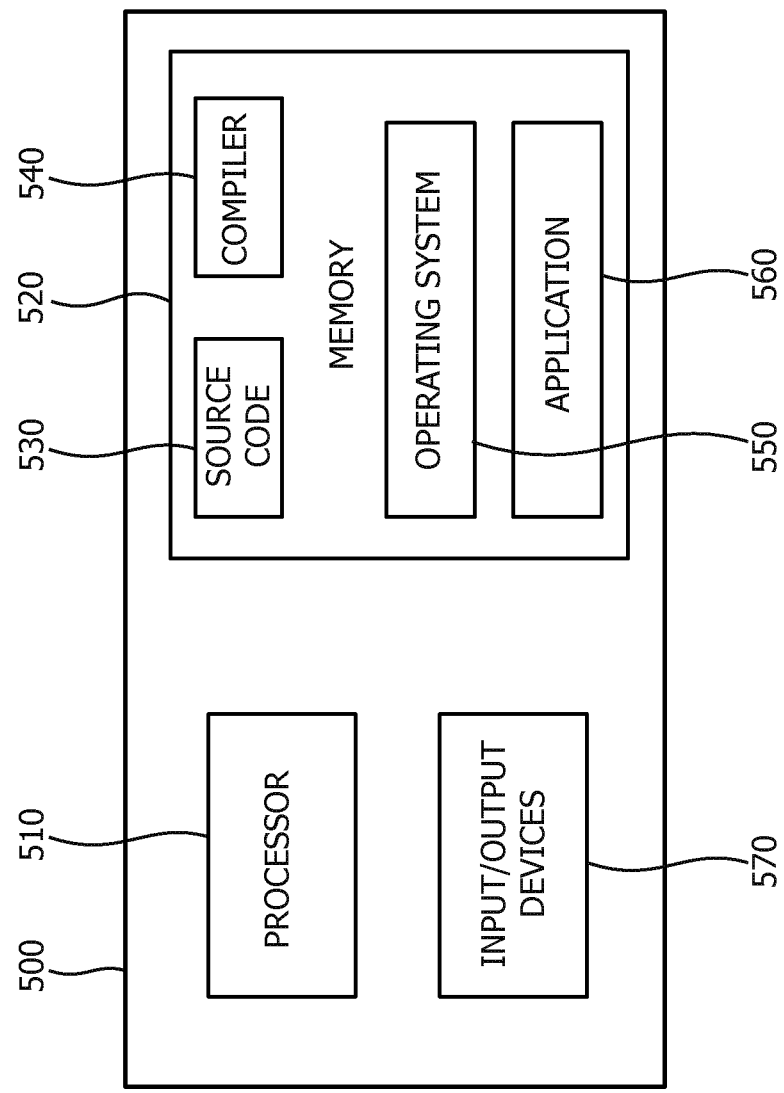
FIG. 5 is a block diagram of a computer (such as server device and/or client device) within which one or more parts of the invention can be implemented.

FIG. 5 illustrates an example of a computer 500 within which one or more parts of an embodiment may be employed. The system can be or parts of the system can be such a computer. Various operations discussed above may utilize the capabilities of the computer 500. For example, one or more parts of a database query generating system (or display device thereof) may be incorporated in any element, module, application, and/or component discussed herein.

The computer 500 includes, but is not limited to, Personal Computers, workstations, laptops, notebooks, tablets, mobile phones, smart phones, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the 0/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

The invention claimed is:

1. A method of generating a database query for analyzing data in a database using a processor arrangement, the data comprising a plurality of features, wherein at least one of the plurality of features comprises a value which varies as a function of a parameter, the method comprising:
   providing a graphical user interface (GUI) comprising a user input region extending along at least one axis for enabling a user to arrange a plurality of graphical elements in or adjacent the user input region to specify a user-defined sequence as the function of the parameter, the user-defined sequence being based on the relative positioning of the plurality of graphical elements with respect to the at least one axis, and each graphical element being associated with a respective one or more of the plurality of features, wherein the GUI is configured to enable a user to arrange a graphical object relative to at least two graphical elements so as define a time-based relationship between respective features associated with the at least two graphical elements;
   determining, based on the user-defined sequence of the graphical elements, one or more rules relating to at least a horizontal positioning of a start and an end of a particular graphical element relative to a start and an end of a referenced graphical element; and
   generating a database query based on the one or more rules.

2. The method of claim 1, wherein the user input region extends along two orthogonal axes and wherein the GUI is further adapted to enable the user to arrange the plurality of graphical elements in the user input region so as to specify the user-defined sequence based on relative positioning of the plurality of graphical elements with respect to the two orthogonal axes.

3. The method of claim 2, wherein the user input region comprises a grid-like pattern to which the user is enabled to align the plurality of graphical elements, wherein the step of determining one or more rules is further based on a relative alignment of the graphical elements with respect to the grid-like pattern.

4. The method of claim 1, further comprising:
   providing a first user interface component for enabling the user to specify further information relating to the user-defined sequence, wherein the step of determining one or more rules is further based on the further information relating to the user-defined sequence.

5. The method of claim 1, further comprising:
   providing a second user interface component for enabling the user to specify a value of a feature associated with a graphical element of the plurality of graphical elements, wherein the step of determining one or more rules is further based on the value of the feature.

6. The method of claim 1, wherein each graphical element is defined at least by a first graphical property, the first graphical property being representative of a value of a feature associated with the graphical element, wherein the step of determining one or more rules is further based on the first graphical property of at least one of the graphical elements.

7. The method of claim 1, wherein the step of determining one or more rules is further based on the relationship between the features associated with the at least two graphical elements.

8. The method of claim 7, wherein the graphical object is defined at least by an object graphical property, the object graphical property being representative of a value of the features associated with the at least two graphical elements, wherein the step of determining one or more rules is further based on the object graphical property of the graphical object.

9. The method of claim 1, further comprising:
   generating a natural language expression (NLE) of the database query; and
   generating instructions for displaying the NLE of the database query via the graphical user interface.

10. The method of claim 1, further comprising:
    generating instructions for displaying the GUI on a display device using a processor device.

11. A system for generating a database query for analyzing data in a database, the data comprising a plurality of features, wherein at least one of the plurality of features comprises a value which varies as a function of a parameter, the system comprising:
    a processor arrangement adapted to:
       provide a graphical user interface (GUI) comprising a user input region extending along at least one axis for enabling a user to arrange a plurality of graphical elements in or adjacent the user input region to specify a user-defined sequence as the function of the parameter, the user-defined sequence being based on the relative positioning of the plurality of graphical elements with respect to the at least one axis, and each graphical element being associated with a respective one or more of the plurality of features, wherein the GUI is configured to enable a user to arrange a graphical object relative to at least two graphical elements so as define a time-based relationship between respective features associated with the at least two graphical elements;
       determine, based on the user-defined sequence of the graphical elements, one or more rules relating to at least one a horizontal positioning of a start and an end of a particular graphical element relative to a start and an end of a referenced graphical element; and generate a database query based on the one or more rules.

\* \* \* \* \*